United States Patent
Wälti et al.

(10) Patent No.: US 7,048,206 B2
(45) Date of Patent: May 23, 2006

(54) SWIRL PRESSURE NOZZLE

(75) Inventors: Martin Wälti, Bellmund (CH); Kurt Heiniger, Elfingen (CH); Helmut Wulz, Wettswil (CH); Rolf Padrutt, Herrliberg (CH)

(73) Assignee: AxEnergy AG, Pfaffikon (CH)

(*) Notice: Subject to any disclaimer, the term of this patent is extended or adjusted under 35 U.S.C. 154(b) by 267 days.

(21) Appl. No.: 10/485,198

(22) PCT Filed: Aug. 16, 2002

(86) PCT No.: PCT/CH02/00449

§ 371 (c)(1),
(2), (4) Date: Jan. 27, 2004

(87) PCT Pub. No.: WO03/015929

PCT Pub. Date: Feb. 27, 2003

(65) Prior Publication Data

US 2004/0217203 A1 Nov. 4, 2004

(30) Foreign Application Priority Data

Aug. 20, 2001 (CH) .................................. 1528/01

(51) Int. Cl.
*B05B 7/10* (2006.01)
*B05B 1/26* (2006.01)
*B05B 1/34* (2006.01)
(52) U.S. Cl. ...................... 239/399; 239/461; 239/463; 239/464; 239/403; 239/483
(58) Field of Classification Search ................ 239/399, 239/403, 461, 463, 464, 468, 475, 483, 487, 239/494, 501
See application file for complete search history.

(56) References Cited

U.S. PATENT DOCUMENTS

| 2,569,033 | A | | 9/1951 | Wise |
| 4,584,000 | A | * | 4/1986 | Guest .............................. 95/36 |
| 5,106,022 | A | | 4/1992 | Pook |
| 5,713,327 | A | * | 2/1998 | Tilton et al. ................. 123/299 |
| 6,517,012 | B1 | * | 2/2003 | Slowik et al. ............... 239/464 |

FOREIGN PATENT DOCUMENTS

| DE | 4118538 | 12/1992 |
| EP | 41 18 538 A1 | 12/1992 |
| GB | 967524 | 8/1964 |

OTHER PUBLICATIONS

International Search Report, PCT/CH0200449.

* cited by examiner

*Primary Examiner*—Davis Hwu
(74) *Attorney, Agent, or Firm*—Welsh & Katz, Ltd.

(57) ABSTRACT

A swirl pressure nozzle with a nozzle body is proposed, in which an inner area is provided, which has a tapered section with a largest diameter and a smallest diameter. The nozzle has an inlet which leads into the section in an essentially tangential manner, which has a diameter, such that a fluid medium can be guided under pressure through this inlet in an essentially tangential manner into the tapered section of the inner area. The section has an axial length and at its end with the smallest diameter leads into an outlet of the nozzle, which has the same diameter as well as a length. The different parameters are in a ratio to each other, that lies in the following ranges:

$D_p/D_o$ in the range from 0.42 to 1.56;

$D_s/D_o$ in the range from 3 to 8;

the angle of opening (alpha) of the tapered section greater than 60°;

$L_o/D_o$ in the range from 0.2 to 1.5.

10 Claims, 3 Drawing Sheets

SWIRL PRESSURE NOZZLE

FIELD OF THE INVENTION

The invention relates to a nozzle, and more particularly, to swirl pressure nozzle.

BACKGROUND

The construction of swirl pressure nozzles is well known. They have a nozzle body, in which typically a conical tapered inner area is provided. One or more inlets lead into this tapered inner area in an essentially tangential manner, more precisely to the end section of the tapered inner area with the largest diameter. At the end of the inner area with the smallest diameter, the inner area leads into the outlet of the nozzle.

In operation a fluid medium is fed under pressure through the inlet in an essentially tangential manner into the tapered inner area, more precisely into the end section of the inner area with the largest diameter. The fed fluid medium moves along the inner wall, which forms the tapered inner area, and forms there a fluid film when the ratio of tangential to axial speed is sufficient. If the fluid medium reaches the end of the inner area with the smallest diameter—therefore the section where the tapered inner area joins the outlet of the nozzle—and if the fluid medium goes through the outlet, the film breaks away and it forms fine droplets outside the outlet of the nozzle.

Such nozzles are employed for example in energy generation processes which use gas turbines. The air flow volume sucked in by the compressor has a variable density according to climatic conditions. The customary performance indication of gas turbines is based on ISO-standard values (at 15° C., 60% relative humidity, 1013 hPa pressure). If the air temperature rises, the density of the incoming air decreases, and so a decrease of the performance of the gas turbine will be noted. With the help of nozzles, fine water droplets can be added to the incoming air, in which a decrease of the air temperature is brought about by evaporation and therefore an increase in the density occurs. The consequence is that the performance of the gas turbine improves.

In principle it is possible to vaporise so many water droplets in the air current ("fogging"), until the relative humidity is 100%. As a result the aforementioned cooling of the air occurs, and the air density is increased. However if the air is completely saturated, droplets can no longer be vaporised with an additional influx of water droplets.

Nevertheless, it is known that a further influx of water droplets ("overfogging") can have the consequence that the amount of electrical energy which is extractable from the turbine increases, even though the water droplets can no longer be vaporised in the air current in the air admission channel. That nevertheless the amount of extractable electrical energy increases, is a result of the fact that by supply of the air current to the turbine, the air in the compressor sector of the turbine is compressed, which warms up the previously saturated air and thus making it able to take up additional moisture. The surplus water droplets contained in the air current in the air admission channel can then be vaporised by the elevated temperature in the air current and can contribute to the increase of the electrical energy which is extractable from the turbine.

As a result of the supply of such an air current oversaturated with water droplets, there is the danger that erosion in the compressor section of the gas turbine can occur. So that such an erosion does not occur, the droplet sizes of the water drops are not allowed to be greater than about 10–30 µm. However, the generation of such fine droplets is not so trivial and places high demands on the corresponding nozzles with which such fine droplets are to be produced.

A known type of nozzle with which it is possible to produce such fine water droplets, is the so called "rebound bow nozzle" ("Prallbügel-Düse"). Such a rebound bow nozzle has a bent bow—the rebound bow—whose peak is arranged opposite the outlet of the nozzle. The water jet coming out of the outlet of the nozzle collides against the peak of this rebound bow, which results in a spray being formed and the desired fine water droplets being created.

This nozzle per se is in working order. However the rebound bow must be adjusted very exactly relative to the outlet, so that the desired fine droplets can be formed. This exact adjustment of the rebound bow relative to the outlet must always be maintained, in which it must be taken into account that the rebound bow is extremely exposed both during installation as well as during operation. In addition, the production of the nozzle is difficult, and also it has disadvantages with regard to its service life. Also with a rebound bow nozzle erosion can appear with time, so that from time to time the nozzle must be changed to ensure that the desired spray quality (maximal droplet size) can be guaranteed. This considerably reduces the profitability of the nozzle itself and also of the total facility, because the change of the nozzles can not be effected without an interruption of the system.

Although in principle the swirl pressure nozzles described in the beginning function very reliably and also have a very good service life, hitherto they have not been able to be employed for such a use, because with this type of nozzle the finest required droplets could not be produced.

SUMMARY

Here the invention seeks to provide a remedy. It is therefore an object of the invention, to propose a swirl pressure nozzle of the type named at the beginning, with whose help it is possible to produce water droplets with an average droplet size smaller than 10–30 µm, preferably even with an average droplet size smaller than 10 µm, with an accordingly narrow distribution of the total occurring droplet sizes. In particular, although not exclusively, this is to be possible for large flow volumes of water, in particular up to around 50 litres per hour ("overfogging").

This object is achieved by a swirl pressure nozzle of this invention, as is characterised by the features of the independent patent claim. Further preferred embodiments of the swirl pressure nozzle of this invention are revealed by the dependent patent claims.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings. Further advantages are revealed with the help of the diagram in the following description of a preferred embodiment of the swirl pressure nozzle of this invention.

DETAILED DESCRIPTION

In this written description, the use of the disjunctive is intended to include the conjunctive. The use of definite or indefinite articles is not intended to indicate cardinality. In particular, a reference to "the" object or thing or "an" object or "a" thing is intended to also describe a plurality of such objects or things.

Figure 3:
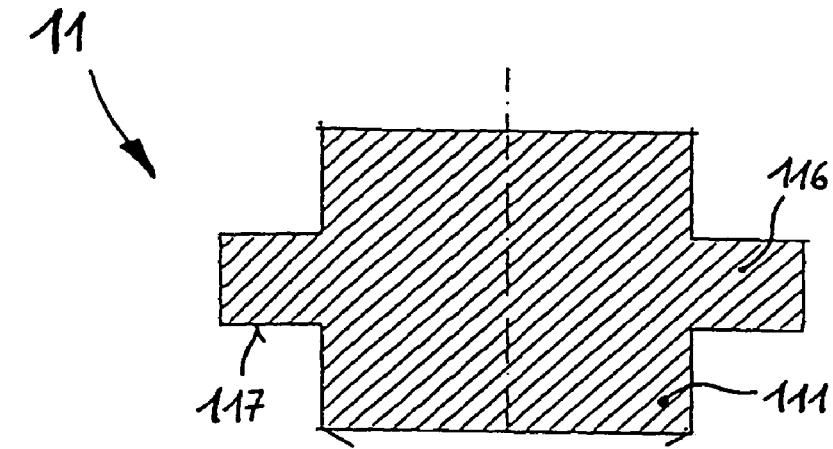
FIG. 3 an embodiment of a cover for the sealing of the inner area of the nozzle body.
Figure 1:
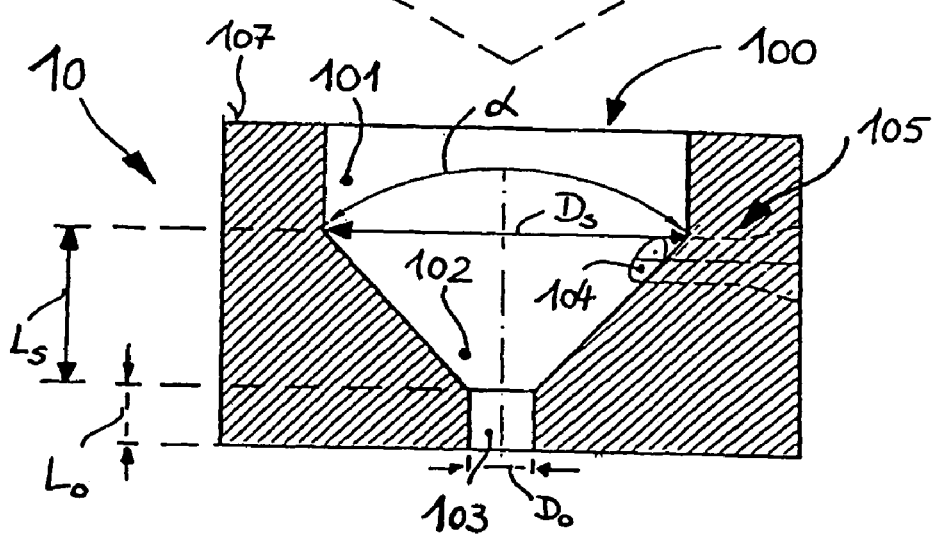
FIG. 1 an embodiment of the nozzle body of the swirl pressure nozzle of this invention.

In FIG. 1 an embodiment of the nozzle body 10 of the swirl pressure nozzle of this invention is presented, whereas in FIG. 3 the accompanying cover 11 for the sealing of the inner area 100 of the nozzle body 10 is shown. It can be recognised from FIG. 1 that the nozzle body 10 has an inner area 100, which first of all has a cylindrical section 101, in which a correspondingly cylindrical section 111 of the cover 11 (FIG. 3) is placed when assembled. This cylindrical section 101 of the inner area 100 is adjoined by a conical section 102 of the inner area 100. The conical section 102 has its largest diameter $D_s$ at the point where the cylindrical section 101 leads into the conical section 102. At its other end, that is where the conical section 102 has its smallest diameter $D_o$, it leads into the outlet 103. The transition of the cylindrical section 101 into the conical tapered section 102, as well as the transition of the conical tapered section 102 into the outlet 103 occurs smoothly, that is without sharp edges or at the most with rounded edges. The presentation with sharp edges is shown in FIG. 1 simply for better clarity, so that one can better distinguish the different sections from each other.

Figure 2:
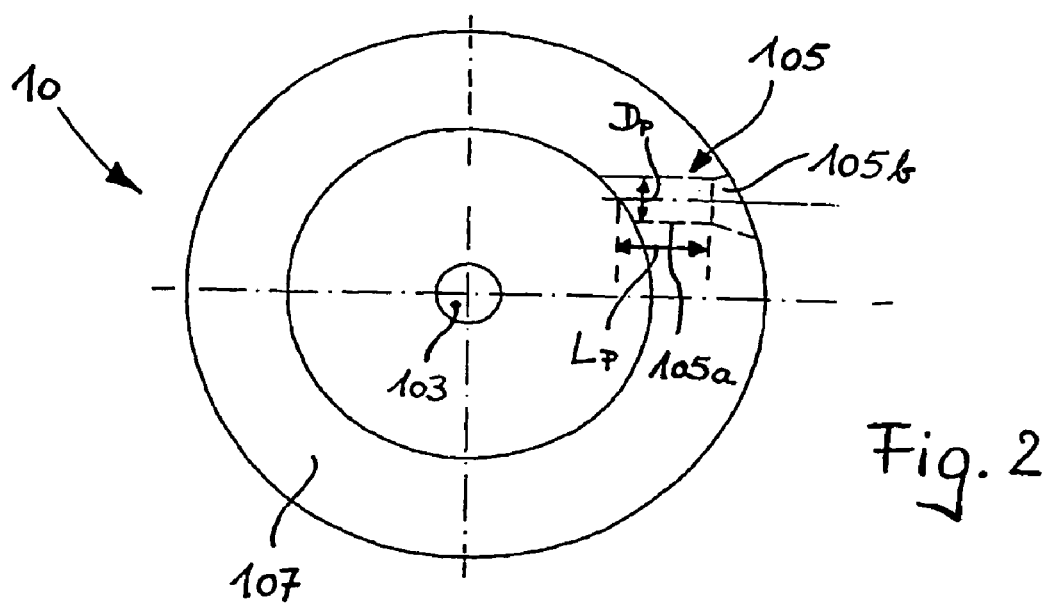
FIG. 2 a top view of the nozzle body of FIG. 1.

In the upper end region of the conical tapered section 102 an inlet 104 is provided, which more or less tangentially—in this application drawn in an essentially tangential manner—leads into the conical section 102 of the inner area 100 (see also FIG. 2). A supply channel 105, which in practice preferably has a very short length $L_p$, leads into this inlet 104. This supply channel 105, in the embodiment shown here, has—when viewed from the inlet 104 out—first of all a cylindrical section 105a, which itself is joined to a widened section 105b. The widening of the widened section 105b occurs smoothly and has no angular edges (at most the edges are rounded). The presentation concerning this in FIG. 1 is so drawn only for the sake of clarity, in order to better recognise that the supply channel 105 has a cylindrical section 105a and a widened section 105b. It can also be provided with several inlets 104, e.g. two or four inlets with corresponding supply channels.

The diameter of the cylindrical section 105a corresponds to the diameter $D_p$ of the inlet 104. The diameter $D_p$ of the inlet 104 is thereby regarded as the diameter which is revealed if the inlet 104 is projected on a plane which extends vertically to the longitudinal axis of the supply channel 105. In practice, the boundary of the inlet 104 is bent because of the limited expansion of the inlet 104, as one can easily recognise from FIG. 2, from which one is well able to distinguish the lay-out of the inlet 104 as well as that of the supply channel 105.

The embodiment of the cover 11 presented in FIG. 3 serves to seal the inner area 100 of the nozzle body 10. The cover 11 has a section 111, which fits into the cylindrical section 101 of the inner area 100. Furthermore it has a surrounding section 116, which has supporting areas 117, which when the structure is assembled, lie flat against the surface 107 of the nozzle body 10. The inner area 100 of the nozzle body is then sealed closed on the side opposite to the outlet 103. A further embodiment of such a cover is seen in FIG. 3 via the striped lines.

In operation a fluid medium, typically demineralised water, is fed in via the supply channel 105 and the inlet 104 in an essentially tangential manner into the upper end region of the tapered section 102 of the inner area 100. The fluid that is fed in is caused to swirl by the form of the conical section. On the inner wall a water eddy forms, which, when there is a sufficiently big swirl in the region of the outlet 103, is a hollow eddy (water film with air core). The droplet size of the droplet formed via such a nozzle should be so designed that the average droplet size is in the range of maximum 10–30 µm and so that there is as narrow as possible distribution of the droplet size. Preferably the average droplet size should be smaller than 10 µm with narrow distribution of the droplet size.

So that such an average droplet size can be achieved, some parameters of the nozzle must be chosen in a defined ratio to each other. These are in regard to the diameter $D_p$ of the inlet 104, the diameter of the tapered section 102 at its end with the largest diameter $D_s$, the axial length $L_s$ of the tapered section 102, as well as the diameter of the tapered section 102 at its end with the smallest diameter $D_o$, that is there where the tapered section 102 changes into the outlet 103, which likewise has the diameter $D_o$ and a length $L_o$.

In particular these parameters are in a ratio to one another, which lies in the following ranges:

Diameter of the inlet to the diameter of the outlet $D_p/D_o$ in the range from 0.42 to 1.56 (for a single inlet; for several inlets this range is to be accordingly converted, e.g. for two inlets it is 0.3 to 1.1), which in particular is influenced by whether one, two or e.g. four inlets are provided;

largest diameter of the tapered section 102 to the smallest diameter of the tapered section $D_s/D_o$ in the range from 3 to 8;

length of the tapered section 102 to the largest diameter of the tapered section $L_s/D_s$, such that the angle of the opening α of the tapered section 102 is greater than 60°;

length of the outlet 103 to the diameter of the outlet $L_o/D_o$ is in the range from 0.2 to 1.5, preferably about 0.5.

The angle of the opening α is in a preferred embodiment in the range from 60° to 120° and in particular advantageously about 90°, whereas in other preferred embodiments, the angle of the opening α tends towards 180°.

For example the diameter $D_o$ of the outlet 103 can be in the range from 0.15 mm to 0.8 mm, according to what flow volume of the fluid medium is required. The pressure, with which the fluid medium—here demineralised water—is fed through the channel 105 and the inlet 104 in an essentially tangential manner into the inner area, or more specifically into its tapered section 102, is typically in the range from about 120 bar to about 220 bar, preferably at about 160 bar. The higher the pressure with which the water is fed into the inner area, or more specifically into its tapered section 102, the better. In this regard, the lifespan of the corresponding pumps and the lifespan of the nozzles must be taken into account, which can be shortened with higher pressures.

The supply channel 105, or more specifically its cylindrical section 105a has the same diameter $D_p$ as the inlet 104 in the described embodiment. The length $L_p$ of the supply channel 105, or more specifically of its cylindrical section 105a, is, as previously described, chosen to be as short as possible, so that the least possible kinetic energy of the fluid is lost. The ratio of the length $L_p$ to the diameter $D_p$ is as small as possible and is in particular in the range from 1 to 10.

In a practical embodiment the diameter $D_o$ of the outlet 103 is for example about 0.75 mm. For a nozzle with two inlets (and of course accordingly two supply channels) the ratio of the diameter $D_p$ of the inlet 104 to the diameter $D_o$ of the outlet $D_p/D_o$ is about 0.4 (if only a single inlet is provided, a ratio $D_p/D_o$ of about 0.57 would result). The ratio of the largest diameter $D_s$ of the tapered section 102 to the smallest diameter $D_o$ of the tapered section $D_s/D_o$ is about 6.8. The ratio of the length $L_s$ of the tapered section 102 to the largest diameter $D_s$ results from the geometry of the tapered section 102 at an angle of the opening α of 90° to be about 0.58. The ratio of the length $L_o$ of the outlet 103 to the diameter $D_o$ of the outlet $L_o/D_o$ is in this example about 0.5. The ratio of the length $L_s$ of the tapered section 102 to the diameter $D_p$ is in this example about 7.2. In other preferred embodiments the ratio lies in the range from 1 to 4, preferably 1 to 2.

With help from ceramic injection processes one can make such nozzles, or more specifically nozzle bodies, by injection with ceramic material, and one can likewise produce them with help from sinter processes. As regards suitable materials, all high performance ceramic materials as well as hard metals, sintered metals and plastics, which can be processed in sinter or injection processes, come into consideration. In particular (but not exclusively) the following materials come into consideration: oxide ceramics (such as e.g. aluminium oxide ceramics and zircon oxide ceramics) in different qualities as well as mixed ceramics based on oxide ceramics; non-oxide ceramics (e.g. silicon carbide ceramics and silicon nitride ceramics in different qualities as well as mixed ceramics based on carbides and nitrides; hard metals (e.g. wolfram carbide) in different qualities as well as mixed material (cermets) based on wolfram carbide; all materials used in sinter processes. With materials such as these it is possible to reliably produce such swirl pressure nozzles, or more specifically their nozzle bodies, which have the parameters which are in accordance with the invention, and with which it is possible to produce the desired average droplet sizes with a narrow distribution of the occurring droplet sizes.

Figure 4:
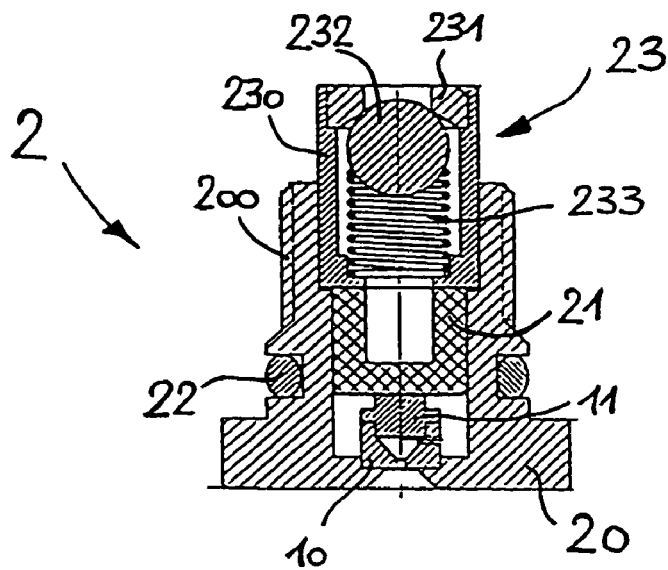
FIG. 4 an embodiment of an assembled nozzle arrangement with filter, seal ring and check valve.

In FIG. 4 an embodiment of an assembled nozzle arrangement 2 is presented. Such a nozzle arrangement 2 can, as presented in FIG. 5 in a screwed in position, be screwed into a connecting pipe 3, through which the nozzle can be supplied with the demineralised water.

Figure 5:
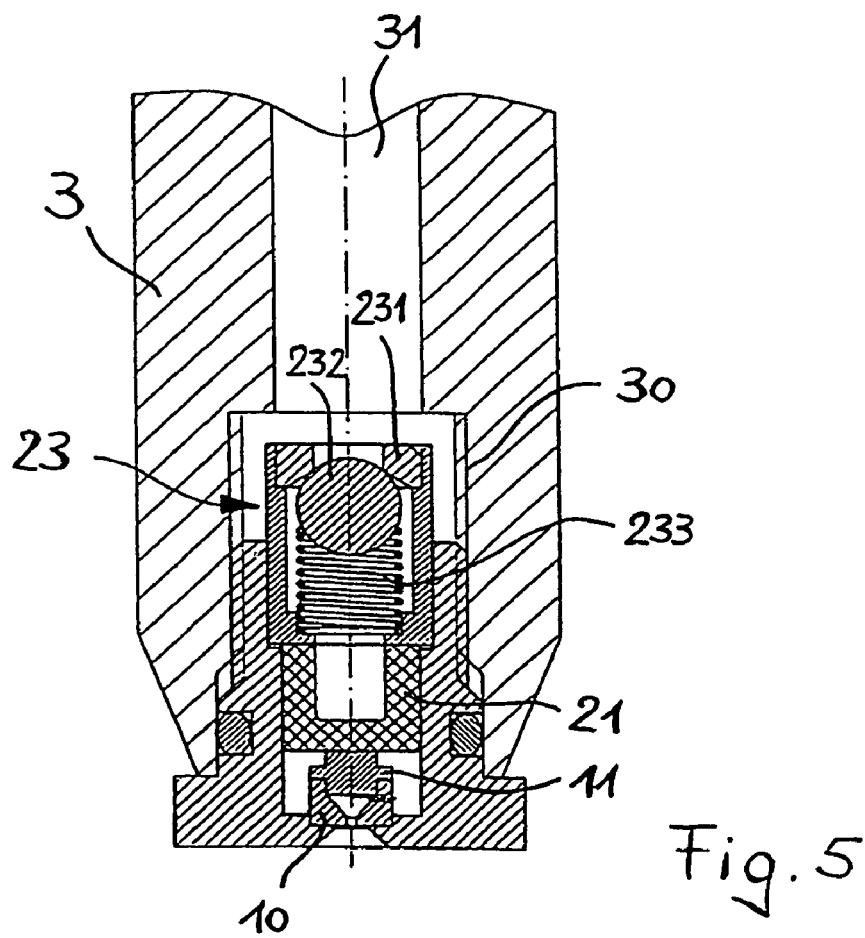
FIG. 5 the nozzle arrangement from FIG. 4, screwed into a connecting pipe.

The nozzle arrangement 2 comprises—in addition to the nozzle body 10 and the cover 11 which were previously described in detail—a filter 21, a seal ring 22, which is performed here by an O-Ring, as well as a check valve 23, which for its part comprises a valve casing 230 with a valve seat 231 for a valve body 232—here in the form of a ball—and a restoring element 233—here in the form of a spring. These individual elements are housed together in a nozzle casing 20, which has an external thread 200 on its end opposite to the outlet, with which the total nozzle arrangement 2 can be screwed into a corresponding receptacle 30 of a connecting pipe 3 (FIG. 5).

The demineralised water, which under appropriate pressure flows through a supply channel 31 of the connecting pipe 3, presses against the valve body 232 (ball) and opens the valve against the restoring force of the restoring element 233 (spring). Due to this the penetrating water reaches the filter 21, in which any potentially existing small particles are filtered out. After flowing through the filter 21, the water reaches the tapered section 102 of the inner area 100 via the supply channel 105 and the inlet 104 in an essentially tangential manner, as already described in detail above. If the pressure with which the demineralised water presses against the valve body 232 sinks under a defined minimum pressure, then the valve closes, while the restoring element 233 (spring) returns the valve body 232 and presses it against the valve seat 231. Also with suddenly occurring, backwards-directed high pressures (return stroke) in the nozzle area, the check valve 23 closes.

Figure 6:
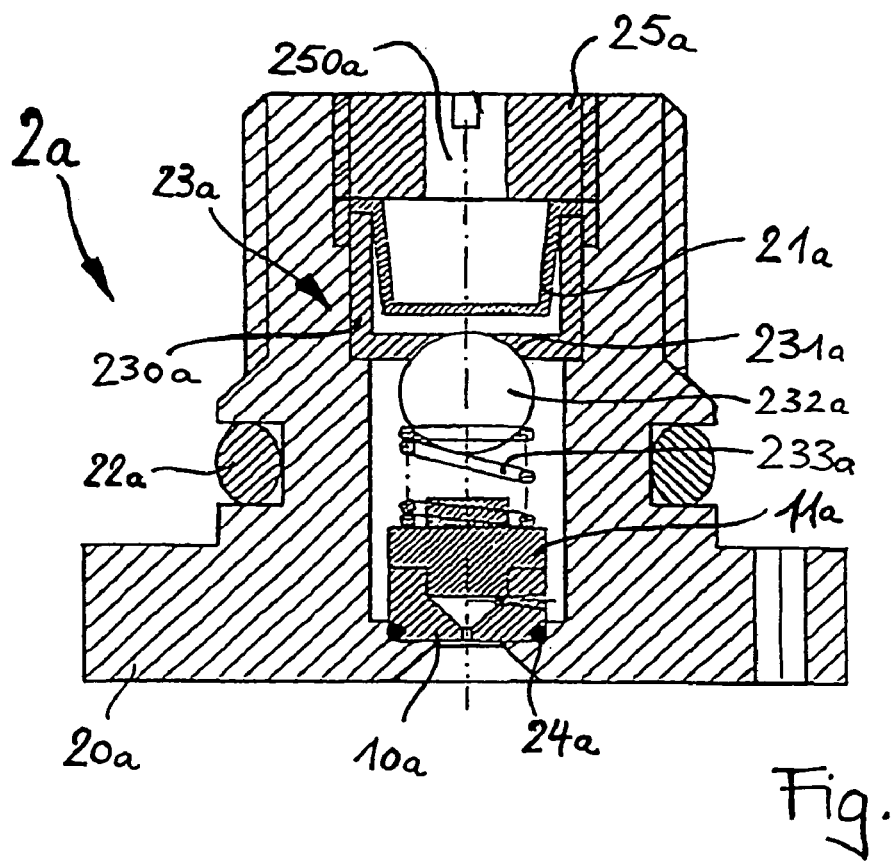
FIG. 6 a further embodiment of an assembled nozzle arrangement.

In FIG. 6 a further embodiment of a nozzle arrangement 2a is presented, which likewise comprises a nozzle body 10a and a corresponding cover 11a, as previously described in detail, as well as seal ring 22a. Furthermore the nozzle arrangement 2a comprises the filter 21a as well as a check valve 23a, which has a valve casing 230a, which at the same time defines the valve seat 231a for the valve body 232a, which in the rest position lies on the valve seat 231a with help of the restoring element 233a—here in the form of a spring. Finally the nozzle arrangement 2a comprises on the outlet side another seal ring 24a, as well as on the inlet side a screw 25a. This screw 25a has a duct 250a, so that the supplied water can reach the nozzle. The said elements are housed in a nozzle casing 20a and are held together when the screw 25a is placed in position.

The embodiment of the nozzle arrangement 2a according to FIG. 6 is distinguished by the fact that—by a compact construction of the nozzle arrangement—the need for adhesion points to adhere parts together, e.g. of the nozzle body 10a in the nozzle casing 20a, can be avoided. Instead the sealing of the nozzle body 10a is effected via the seal ring 24a (O-Ring), and the individual elements can be inserted one at a time in the nozzle casing 20a and be tightened afterwards by the screw 25a.

Figure 7:
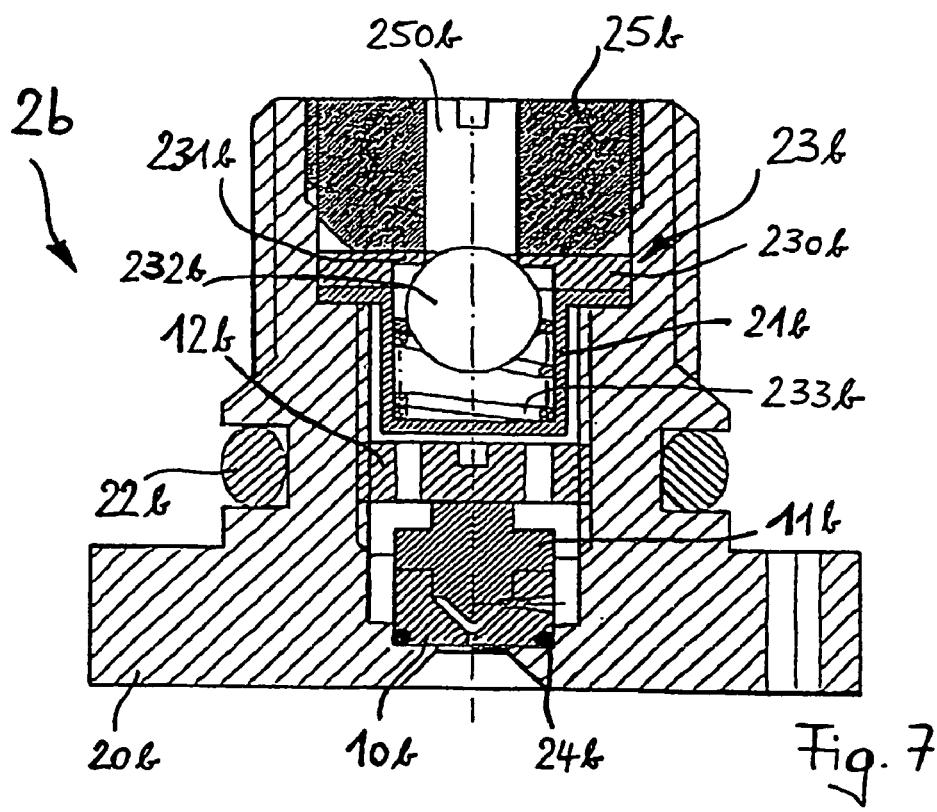
FIG. 7 again a further embodiment of an assembled nozzle arrangement.

A further embodiment of a nozzle arrangement 2b is presented in FIG. 7. The nozzle arrangement 2b presented there also comprises a nozzle body 10b, which was previously described in detail, and a corresponding cover 11b, which in the presented embodiment has a conical part, which can contribute to better "guide" the swirl (similarly as already indicated with striped lines in FIG. 1), as well as a seal ring 22b. The cover 11b is pressed tightly against the nozzle body 10b by means of a straining screw 12b. Furthermore the nozzle arrangement 2b comprises the filter 21b, as well as a check valve 23b, which has a valve panel 230b (instead of a valve casing), which at the same time defines the valve seat 231b for the valve body 232b, which in the rest position with help of the restoring element 233b—here in the form of a spring—lies on the valve seat 231b. Finally the nozzle arrangement 2b comprises another seal ring 24b on the outlet side, as well as a screw 25b on the inlet side. This screw 25b has a duct 250b, so that the water that is fed in can reach the nozzle. The said elements are housed in a nozzle body 20b and are held together when the screw 25a is placed in position.

The nozzle arrangement 2b is distinguished by the fact that its total construction height is reduced, the spring supports itself on one end in the (metal) filter 21b and is arranged within the filter. In addition instead of a valve casing only another valve panel 230b is provided, which gives a little less voluminous, and more easily producible, part. Also here the need to adhere the parts together in production is dispensed with, instead a simple insertion of the individual components is carried out, with a final mechanical tightening together.

Specific embodiments of a swirll pressure nozzle according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. Swirl pressure nozzle with a nozzle body (10), in which an inner area (100) is provided which has a tapered section (102) with a largest diameter ($D_s$) and a smallest diameter ($D_o$), the nozzle having an inlet (104) joining in an essentially tangential manner in the tapered section (102) of the inner area (100), the inlet being provided in the end region of the tapered section (102) of the inner area (100) which has the largest diameter ($D_s$), so that in operation a fluid medium is able to be supplied under pressure through this inlet (104) in an essentially tangential manner into the end region with the largest diameter ($D_s$) in the tapered section (102) of the inner area (100), in which the tapered section (102) of the inner area (100) has an axial length ($L_s$) and at its end with the smallest diameter ($D_o$) leads into an outlet (103) of the nozzle, which has the same diameter ($D_o$) as well as a length ($L_o$) characterised in that the inlet has a diameter ($D_p$) and that the different parameters are in a ratio to each other, that lies in the following ranges:

diameter of the inlet to the diameter of the outlet ($D_p/D_o$) in the range from 0.42 to 1.56;

largest diameter of the tapered section (102) to the smallest diameter of the tapered section ($D_s/D_o$) in the range from 3 to 8;

length of the tapered section (102) to the largest diameter of the tapered section ($L_s/D_s$) such that the angle of the opening ($\alpha$) of the tapered section (102) is greater than 60°, length of the outlet (103) to the diameter of the outlet ($L_o/D_o$) in the range from 0.2 to 1.5.

2. Nozzle according to claim 1, characterised in that the ratio of the length of the tapered section (102) to the diameter ($D_p$) of the inlet (104) lies in the range from 1 to 4, preferably 1 to 2.

3. Nozzle according to claim 1 or 2, characterised in that the nozzle body (10) comprises a supply channel (105) leading into the inlet (104), which has the same diameter ($D_p$) as the inlet (104).

4. Nozzle according to claim 3, characterised in that the supply channel (105) leading into the inlet (104) has a length ($L_p$), which is as short as possible, in which the ratio of the length ($L_p$) to diameter ($D_p$) lies in particular in the range from 1 to 10.

5. Nozzle according to any one of the preceding claims, characterised in that the nozzle body (10) is produced from a ceramic material, in particular from an oxide ceramic or a non-oxide ceramic, or from a hard metal, or from a material processable in sinter processes.

6. Nozzle according to any one of the preceding claims, characterised in that at least two inlets (104) which are joined in an essentially tangential manner in the tapered section (102) of the inner area (100) are provided, which are distributed in regular intervals on the circumference of that end region of the tapered section (102) with the largest diameter.

7. Nozzle arrangement (2, 2a, 2b) with a nozzle casing (20, 20a, 20b), in which a nozzle, a filter (21, 21a, 21b) as well as a valve (23, 23a, 23b) are arranged, and the nozzle casing (20, 20a, 20b) being provided with a seal ring (22, 22a, 22b), in order to be able to tightly connect with a connecting pipe (3), characterised in that the nozzle is formed according to any one of the preceding claims.

8. Nozzle arrangement (2, 2a, 2b) according to claim 7, characterised in that the seal ring (22, 22a, 22b) surrounds the nozzle casing (20, 20a, 20b), and that the nozzle casing (20, 20a, 20b) is provided with an external thread at the end opposite to the outlet (103) of the nozzle, in order that the external thread is able to be screwed into a corresponding inner thread of a connecting pipe (3).

9. Nozzle arrangement (2a) according to claim 7 or 8, characterised in that the valve (23a) comprises a valve casing (230a), in which the filter (21a) projects into, as well as a spring restoring element (233a) and a valve body (232a), in which the valve casing (230a) defines a valve seat(231a) for the valve body (232a) and the restoring element (233a) is arranged between the valve casing (230a) and the nozzle, so that the end of the restoring element (233a) which is at the nozzle side supports itself on the nozzle, or more specifically on a cover of the nozzle (11a), and that the other end of the restoring element (233a) presses the valve body (232a) in the direction of the valve seat (231a), that furthermore between the nozzle and the nozzle casing (20a) a seal ring (24a) is arranged, and that finally at the end of the nozzle casing (20a) which is at the entry side, a screw (25a) is provided, which fixs the filter (21a), the valve (23a) and the nozzle is the nozzle casing (20a).

10. Nozzle arrangement (2b) according to claim 7 or 8, characterised in that the valve (23b) comprises a valve panel (230b), a spring restoring element (233b) and a valve body (232b), in which the valve panel (230b) defines a valve seat (231b) for the valve body (232b) and the restoring element (233b) is arranged between the valve panel (230b) and the filter (21b), this filter being connected after the valve panel (230b), so that the end of the restoring element (233b) which is at the nozzle side supports itself on the filter (21b) and the other end of the restoring element (233b) presses the valve body (232b) in the direction of the valve seat (231b), and in which the valve (23b) and the filter (21b) are fixed in the nozzle casing (20b) with the help of a screw (25b), and that furthermore a seal ring (24b) is arranged between the nozzle and the nozzle casing (20b), at which the nozzle lies fixed with the help of a straining screw (12b).

* * * * *